United States Patent [19]

Tanaka et al.

[11] Patent Number: 4,860,220

[45] Date of Patent: Aug. 22, 1989

[54] APPARATUS FOR DISPLAYING THREE-DIMENSIONAL OBJECTS

[75] Inventors: Toshiaki Tanaka, Kawasaki; Hiroyuki Mizutani, Yokohama, both of Japan

[73] Assignee: Kabushuki Kaisha Toshiba, Kanagawa, Japan

[21] Appl. No.: 30,046

[22] Filed: Mar. 25, 1987

[30] Foreign Application Priority Data

Mar. 29, 1986 [JP] Japan .................. 61-72111

[51] Int. Cl.$^4$ ............................................. G06F 7/00
[52] U.S. Cl. ............................ 364/522; 340/729
[58] Field of Search ................. 364/521, 522, 518; 340/724, 747, 729

[56] References Cited

U.S. PATENT DOCUMENTS

| | | | |
|---|---|---|---|
| 3,621,214 | 11/1971 | Gordon et al. | 235/151 |
| 4,222,048 | 9/1980 | Johnson | 340/747 |
| 4,238,826 | 12/1980 | Jones, Jr. | 364/515 |
| 4,594,673 | 6/1986 | Holly | 364/522 |
| 4,727,365 | 2/1988 | Bunker et al. | 340/728 |
| 4,736,306 | 4/1988 | Christensen et al. | 364/513 |

OTHER PUBLICATIONS

Greenberg, D. P., "Computer Graphics in Architecture" Tutorial: Computer Graphics, Feb./79, pp. 396–404.

H. D. Block, "The Perceptron: A Model for Brain Functioning, I," Reviews of Modern Physics, vol. 34, No. 1, Jan. 1962.

N. Kodaira, et al., "Interactive Robot Programming with Real-Time Graphic Simulation," IECON, pp. 35–39, 1984.

Primary Examiner—Gary V. Harkcom
Assistant Examiner—Phu K. Nguyen
Attorney, Agent, or Firm—Finnegan, Henderson, Farabow, Garrett, & Dunner

[57] ABSTRACT

Display apparatus retrieves the form and position data for each of a plurality of three-dimensional objects from an environmental data memory and gives a two-dimensional figure display of the plurality of three-dimensional objects on the display in accordance with the form and position data for these objects. When a two-dimensional figure includes interference between two or more objects, a line-of-sight vector, along which it is possible to display two-dimensional figures free from interference, is calculated, and interference-free two-dimensionally displayed figures for the plurality of three-dimensional objects are generated in accordance with the computed line-of-sight vector and the form and position data for each object.

9 Claims, 4 Drawing Sheets

APPARATUS FOR DISPLAYING THREE-DIMENSIONAL OBJECTS

BACKGROUND OF THE INVENTION

The present invention relates to a display apparatus for displaying a plurality of three-dimensional objects on a display as two-dimensionally displayed figures, and for showing precisely the positional relationship among the three-dimensional objects in a manner suitable, for instance, to robot simulation or the like.

Along with the advancement in robot technology, there have been developed various kinds of languages to control and manipulate robots. Computer robot language has frequently been used to simulate the behavior of a robot.

A robot's simulator displays the robot hands and the three-dimensional objects with which the robot is interacting. The robot's hands and objects are shown on the display as two-dimensional figures, and the motion of the robot hands is traced on the display. In the two-dimensional display of the three-dimensional objects, each object is treated as a projected figure or a perspective figure as seen from a certain line-of-sight. Accordingly, the user follows the behavior of the robot on the two dimensional display controlled by the robot language while inspecting the presence or absence of any connecting relationship indicated on the display, such as interference (collision) between objects that are displayed as two-dimensional figures.

However, when the projected views or perspective views are employed, the displayed positional relationship among the objects varies depending on the direction of line-of-sight. For this reason, the user can have difficulty in visualizing the interfering relationships among a plurality of objects, and whether or not the objects appear to be in contact or separated depends upon the direction of the line-of-sight.

Therefore, if a plurality of objects that are displayed as two-dimensional figures are seen as overlapping (when it is not clear whether or not there exists an interference), the user gives the command to change the direction of line-of-sight. Upon receipt of this command, the simulator obtains and displays a projected or perspective view of the three-dimensional objects as seen along a different direction of line-of-sight. However, the selection of the direction of line-of-sight is executed by the user on a trial and error basis. It is not unusual to change the line-of-sight many times until the user can determine whether interference exists among the objects. The prior art systems consequently have poor processing efficiency.

The general operation and programming of a robot is discussed in Kodaira et al., "Interactive Robot Programming with Real-Time Graphic Simulation," IECON'84, pp. 35-39.

SUMMARY OF THE INVENTION

The object of the present invention is to provide an apparatus for displaying a plurality of three-dimensional objects as two-dimensional figures, and to detect interferential relationships among the objects in a form that can be understood clearly, without repeated changes in the direction of line-of-sight. The display apparatus reads out form and position data for each of the designated three-dimensional objects from an environmental data memory and calculates a direction of line-of-sight which can display without mutual interference two-dimensionally displayed figures of the plurality of three-dimensional objects based on the form and position data obtained. The apparatus then prepares two-dimensional figure data for the plurality of three-dimensional objects in accordance with the calculated direction of line-of-sight and the form and position data obtained.

According to the present invention, interferential relationships among a plurality of three-dimensional objects is checked in accordance with the form and position data for the three-dimensional objects. When it is determined that there does not exist interference, a direction of line-of-sight which can show clearly the noninterfering state is calculated and two dimensionally projected figure data from that direction of line-of-sight is determined. Therefore, a plurality of objects that have no mutual interference can be displayed as two-dimensional figures in a form that clearly show the absence of interference, eliminating the need for the operator to change the direction of line-of-sight on a trial and error basis. As a result, it becomes possible to carry out robot simulation in an efficient manner.

DETAILED DESCRIPTION OF THE PREFERRED EMBODIMENT

Referring now to the figures, the present invention will be described in detail.

Figure 1:
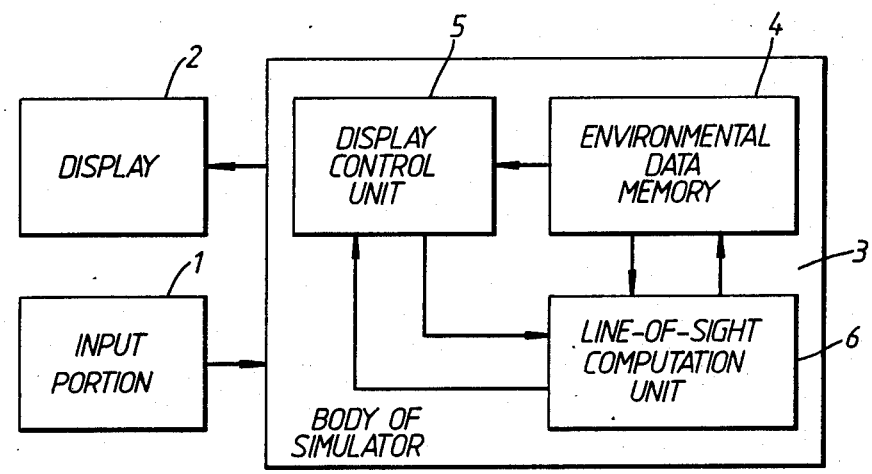
FIG. 1 is a block diagram which shows a preferred embodiment of the present invention.

FIG. 1 shows a schematic block diagram for a preferred embodiment of the present invention which may be applied to a robot simulator.

An input portion 1 can have, for example, a keyboard for inputting control information necessary for operating and controlling a robot simulator. A display 2 displays two-dimensional representations of the robot and the objects with which the robot works A simulator 3 consists of an environmental data memory 4, which stores the form and position data of the robot and the three-dimensional objects, a display control unit 5, which prepares two dimensional figure data for displaying the robot and the three-dimensional objects on the display as two-dimensional figures, and a line-of-sight computation unit 6 which calculates the direction of line of-sight for the robot and the three-dimensional objects to be displayed as two-dimensional figures.

Figures 2A, 2B:
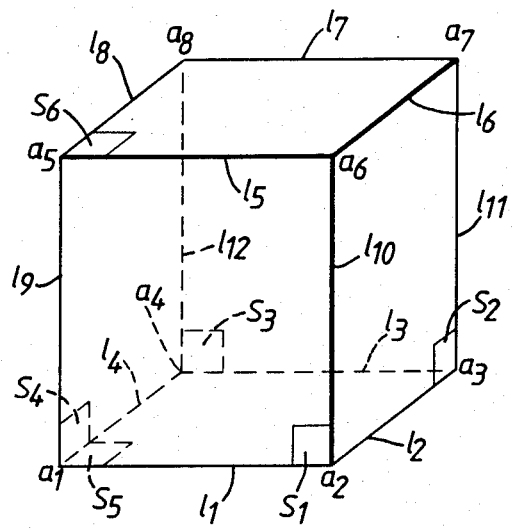
FIG. 2A is a schematic diagram of a representative three-dimensional object which shows the apex numbers, segment numbers, and surface numbers associated with the object.
FIG. 2B is a schematic diagram which shows the internal configuration and contents of the environmental data memory for the object of FIG. 2A.

The environmental data memory 4 stores the form and position data of the robot and the three-dimensional objects as position coordinates of each apex, line segment, and surface information of objects in a predetermined three-dimensional coordinate space. FIG. 2B is a diagram which shows an example of storing the form and position data. For example, for the object depicted as a rectangular parallelepiped in FIG. 2A, coordinate information for eight apices a1–a8 (absolute coordinate values), segment information for 12 sides 11–112 (numbers for both end points of each side), and surface information for 6 surfaces s1–s6 (numbers for all edge points for each surface) are stored as shown in FIG. 2B.

Form and position data concerning each object are retrieved, when the name of the object is designated through the input unit 1 by a display change indication from the environmental data memory 4 in accordance with the name of the object. The information is provided to the display control unit 5 and the line-of-sight computation unit 6 respectively.

The display control unit 5 determines the two-dimensional figure data by computing the projected coordinates as seen from a particular direction of line-of-sight for each object from the form and position data concerning each object in accordance with the direction of line-of-sight (line-of-sight vector) indicated by the line-of-sight computation unit 6 as will be described below. The two-dimensional figure data obtained in the display control unit 5 is given to the display 2 where the two-dimensional figure is displayed. Ordinarily, information in a certain predetermined direction of line-of-sight is provided from the line-of-sight computation unit 6. Consequently, the display control unit 5 prepares two-dimensional figure data from the predetermined direction of line-of-sight, and displays the data on the display 2.

Figure 3:
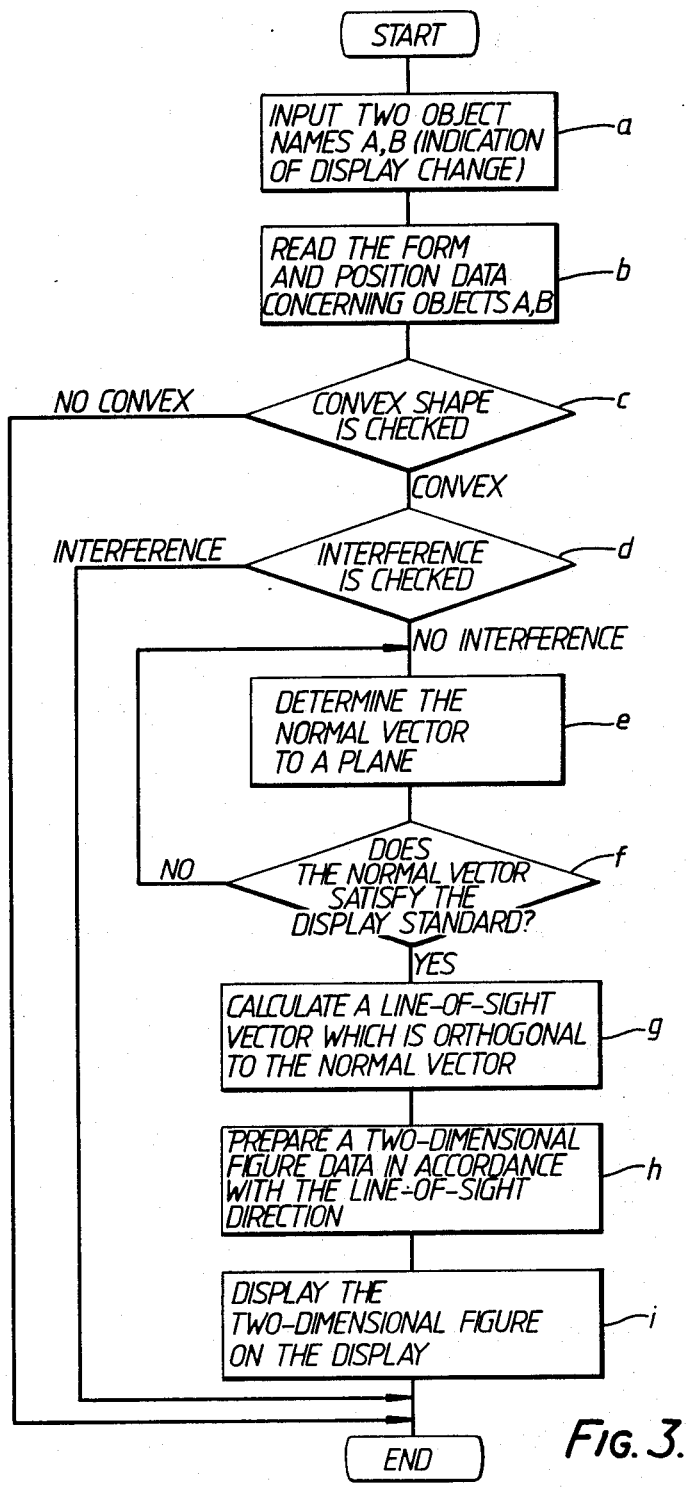
FIG. 3 is a flow chart which shows the processing procedure of the apparatus shown in FIG. 1.

The line-of-sight computation unit 6 is actuated when an operator indicates for a change in the direction of line-of-sight, via the input unit 1. the line-of-sight computation unit 6 calculates a line-of-sight vector for displaying a three-dimensional object as a two-dimensional figure using the method as shown in FIG. 3.

FIG. 3 describes the process of displaying the two-dimensional figures. When the interferential relationship between some objects that are displayed on display 2 is unclear (for example, when two objects are displayed as mutually overlapping), input unit 1 indicates a change in display. This indication of display change can be accomplished by inputting the names of the two objects whose interferential relationship the operator wishes to clarify (step a). The line-of-sight computation unit 6 retrieves the form and position data concerning the specified two objects from the environmental data memory 4 (step b). Next, both objects are tested to determine if either has a convex shape (step c). If either object is convex (i.e. the surfaces of the object are convex), a check is made to determine whether or not the two objects are mutually interfering (step d). If no interference exists, the normal vector to a plane which separates the two objects is determined using the form and position data for the two objects (step e). Selection of the normal vector is continued until it is found to satisfy the display standard, that is, until a vector is determined that is normal to a plane which completely separates the two objects (step f). Once a normal vector is determined, a line-of-sight vector which is orthogonal to the normal vector, namely, a line-of-sight direction along which it is possible to display the two objects as two-dimensional figures without mutual interference, is calculated (step g). The line-of-sight vector determined in this manner is provided to the display control unit 5 where two-dimensional figure data for the two objects is prepared in accordance with the line-of-sight direction (step h). The newly obtained two-dimensional figure is displayed on the display 2 (step i). Thus the line-of-sight direction which displays an ambiguous two-dimensional figure indicating an interferential relationship of the three-dimensional objects is changed to one showing without ambiguity the relationship of the objects.

Next, the computational processing for the line-of-sight direction in the line-of-sight computation unit 6 will be described in more detail.

When two objects A and B that mutually overlap on display 2 are identified at input 1, the form and position data are read respectively as follows.

$$A = \{a_i(i=1,\ldots m), l_i'(i'=1,\ldots m'), s_i''(i''=1,\ldots m'')\},$$

$$B = \{b_j(j=1,\ldots n), l_j'(j'=1,\ldots n'), s_j''(j''=1,\ldots n'')\},$$

where $a_i$ and $b_j$ are apex coordinates; $l_i'$ and $l_j'$ are end points of sides; $s_i''$ and $s_j''$ are all edge points of a surface.

Then, whether or not the two objects A and B are convex is checked. The method for confirming that an object is convex is to see that all of the segments that are obtained by joining arbitrary end points of the objects (namely, $\overline{a_{i1}a_{i2}}$ ($1 \leq i1, i2 \leq m$) for object A, and $\overline{b_{j1}b_{j2}}$ ($1 \leq j1, j2 \leq n$) for object B) are contained within the object.

If at least one of the objects has a concave surface, there can be a penetrating relationship between the objects although there is no interference or contact. There are some cases in which it is not possible to display the objects as separate two-dimensional figures even with changes in the line-of-sight direction. In those cases, the computational processing for the change of line-of-sight direction will not be carried out. However, if the two objects are situated sufficiently separate from each other so that a concave object may be regarded as though it were a convex object and the computational processing for the line-of-sight direction for two-dimensional figure display by separation may be carried out.

When two objects A and B are confirmed to be convex objects, the first step is to judge whether or not they are mutually interfering based on the form and position data for them. The method for judging this is done by examining whether or not any side of object A intersects with the surfaces of object B. In other words, first the line equation for an arbitrary side of object A is determined from $l_i'$, second the plane equation for, an arbitrary plane of object B is determined from $s_j''$, and third the intersection between the corresponding infinite line and the infinite plane is determined.

Next, it is determined if the intersection lies on the finite side of object A and in the finite plane of object B and a similar test is carried out for all possible combinations of all sides of A and for all surfaces of B. If it is found for all the combinations that none of the intersections are on the finite side of object A or at a surface of object B then a similar examination is carried out for the reversed situation, namely, for each side of B and for each surface of A. If no intersections are found to lie in the regions corresponding to interference between objects for all possible combinations, then it is determined that the two objects A and B are not mutually interfering. When there is an interference between objects, it is impossible to obtain a two-dimensional figure display showing separation of the two objects, so that the processing will be discontinued at that point.

Figure 4:
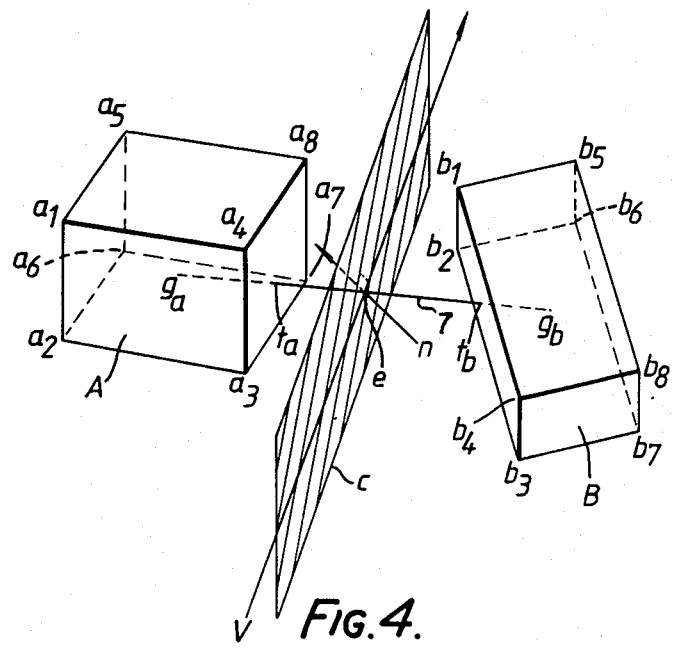
FIG. 4 is a schematic diagram which illustrates the reform determining a direction of line of sight.

Now, when two convex objects A and B exist in three dimensional space without mutual interference, there exists necessarily some plane C which separates the objects A and B, as shown in FIG. 4. Consequently, by choosing a direction in the plane C as a direction of line-of-sight, it becomes possible to display the two objects A and B as separate two-dimensional figures.

If the position coordinate of a fixed point in the plane C is called e, the position coordinate of an arbitrary point in the plane C is called x, and the normal vector to the plane C is called n, then the equation of the plane C is given by $$(x-e) \cdot n = 0,$$

where . signifies an inner product. If respective apices $a_i$ and $b_j$ of the two objects A and B are located into two regions defined by the plane C, it can be said that the plane C separates A and B in the three-dimensional space. Therefore it is sufficient if the following conditions are met:

$$(a_i - e) \cdot n > 0 \ (i = 1, 2, \ldots m), \tag{1}$$

$$(b_j - e) \cdot n < 0 \ (j = 1, 2, \ldots n).$$

By finding a normal vector n that satisfies the above conditions, and by determining a vector V which satisfies $$V \cdot n = 0,$$

one may choose the vector V as the line-of-sight vector. That is, the line-of-sight vector V may be used for the line-of-sight direction which can display the two objects A and B as non-overlapping two-dimensional figures. (It should be noted that the vector V which satisfies the above orthogonality condition can exist as a plurality of solutions, but it suffices if one of them is obtained.)

The fixed point e in the plane C preferably is determined as follows. First, the centers of gravity ga and gb of the two objects A and B, respectively, can be represented from the apex coordinates in the form and position data as $$ga = \frac{1}{m} \sum_{i=1}^{m} a_i, \ gb = \frac{1}{n} \sum_{j=1}^{n} b_j.$$

Since the objects A and B are convex objects, each of the respective centers of gravity ga and gb are interior points of the objects. In addition, due to the fact that the objects A and B are free from interference as mentioned earlier, there necessarily exists a point on the straight line 7 (as shown in FIG. 4) that connects the two centers of gravity ga and gb, and that is not an interior point of either one of the objects. Therefore, one needs only to choose a point on the straight line 7 which is contained in neither of the objects A and B, as the fixed point e in the above.

More specifically, if the equation for the straight line 7 is given by $$k = g_a + t(g_b - g_a), \ 0 \leq t \leq 1,$$

one needs to determine the maximum value of $t (= t_a)$ for a point k on the straight line 7 that can exist as an interior point of the object A, and the minimum value of $t (= t_b)$ for a point k that, can exist as an interior point of the object B. Then, as shown in FIG. 4, the fixed point e may be defined as the midpoint between these points as given by $$e = g_a + \frac{t_a + t_b}{2} (g_b - g_a).$$

On the other hand, the normal vector n to the plane C can be determined by using, for example, the two-division learning system of Perceptron. If one sets $$a_i - e = a_i', \ b_j - e = b_j'$$

for the apex coordinates $a_i$ and $b_j$ and the fixed point e, the conditions in Equation (1) become $$a_i' \cdot n > 0 \ (i = 1, 2, \ldots m), \tag{2}$$

$$b_j' \cdot n < 0 \ (j = 1, 2, \ldots n),$$

Consequently, by arbitrarily choosing an initial value for the normal vector n, one examines whether or not the conditions in Equation (2) are satisfied by that normal vector n. For example one chooses $$n = \begin{pmatrix} 1/\sqrt{3} \\ 1/\sqrt{3} \\ 1/\sqrt{3} \end{pmatrix}$$

as the initial, value for n, and examines whether or not the conditions in Equation (2) are satisfied for $a_i'$ and $b_j'$. If at least one of the conditions in Equation (2) for $a_i'$ and $b_j'$ is not satisfied, then the initial value of the normal vector n is changed as follows.

(For the case of $a_i' \cdot n \leq 0$)

$$n = n - 2 \frac{a_i' \cdot n}{||a_i'||^2} a_i',$$

(For the case of $b_j' \cdot n \geq 0$)

$$n = n - 2 \frac{b_j' \cdot n}{||b_j'||^2} b_j',$$

where $|\ |$ the magnitude of a vector. By repeating such a change of the normal vector and the decision processing of whether or not the normal vector n satisfies the conditions in Equation (2), one can determine a normal vector n that satisfies both of the conditions.

According to the learning method of Perceptron, the existence of the solution is guaranteed so that with a finite number of changes of the normal vector n, it is possible to determine a normal vector n that satisfies the conditions in Equation (2).

Using a normal vector n thus obtained, the line-of-sight direction (line-of-sight vector V) for which a two-dimensional figure display is possible with a complete separation of the two objects A and B, can be determined.

For example, if one writes the normal vector n obtained as $$n = \begin{pmatrix} nx \\ ny \\ nz \end{pmatrix}$$

and the line-of-sight vector V to be determined as $$V = \begin{pmatrix} v_x \\ v_y \\ v_z \end{pmatrix}, v_x^2 + v_y^2 + v_z^2 = 1,$$

then one needs only to determine V that satisfies $$n_x v_x + n_y v_y + n_z v_z = 0$$
$$v_x^2 + v_y^2 + v_z^2 = 1$$

from V.n =0. (Although a plurality of solutions can exist, one needs only to determine one of them.)

When a line-of-sight vector V is obtained in this way, the line-of-sight computation unit 6 shown in FIG. 1 sends the information on V to the display control unit 5. The display control unit 5 prepares two-dimensional figure data to be displayed on the display 2 from the line-of-sight vector V and the apex coordinates ai and bj that are read from the environmental data memory 4. For example, the transformation matrix m for the line-of-sight can be expressed as $$\text{vector } V = \begin{pmatrix} v_x \\ v_y \\ v_z \end{pmatrix}$$

which can be expressed as $$m = \begin{pmatrix} -\frac{v_y}{\sqrt{v_x^2 + v_y^2}} & \frac{v_x}{\sqrt{v_x^2 + v_y^2}} & 0 & 0 \\ -\frac{v_x v_z}{\sqrt{v_x^2 + v_y^2 + v_z^2}\sqrt{v_x^2 + v_y^2}} & -\frac{v_y v_z}{\sqrt{v_x^2 + v_y^2 + v_z^2}\sqrt{v_x^2 + v_y^2}} & \frac{\sqrt{v_x^2 + v_y^2}}{\sqrt{v_x^2 + v_y^2 + v_z^2}} & 0 \\ \frac{v_x}{\sqrt{v_x^2 + v_y^2 + v_z^2}} & \frac{v_y}{\sqrt{v_x^2 + v_y^2 + v_z^2}} & \frac{v_z}{\sqrt{v_x^2 + v_y^2 + v_z^2}} & 0 \\ 0 & 0 & 0 & 1 \end{pmatrix}$$

If the apex coordinates are expressed as $$a_i = \begin{pmatrix} x \\ y \\ z \end{pmatrix}, (i = 1, 2, \ldots, m),$$

then the apex coordinates (X, Y) of the two-dimensional figure to be depicted o the display can be determined by $$\begin{pmatrix} X \\ Y \\ * \\ * \end{pmatrix} = m \cdot \begin{pmatrix} x \\ y \\ z \\ 1 \end{pmatrix}.$$

Figure 5A:
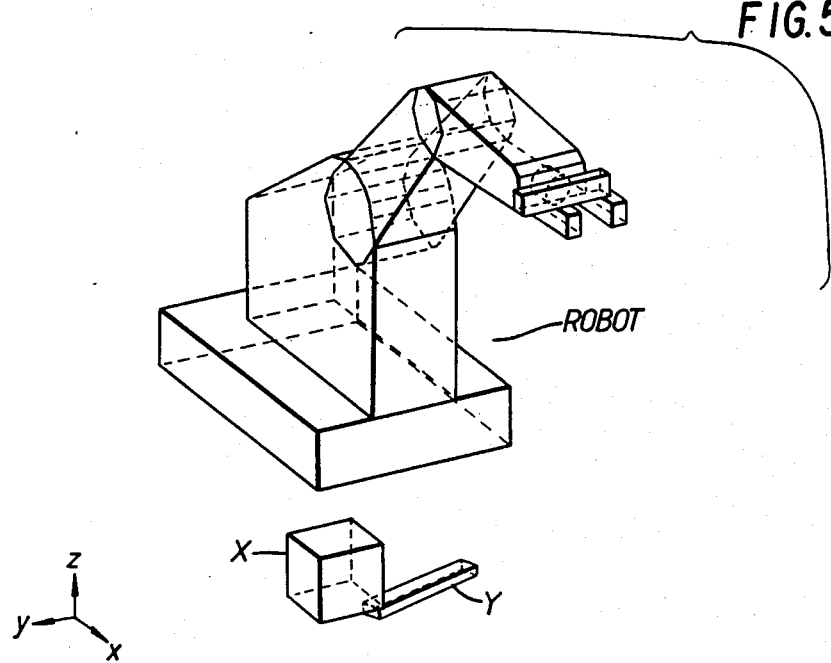
FIG. 5A is a schematic diagram of the display screen which illustrates the presence of interference between two-dimensionally displayed figures for two objects.
Figure 5B:
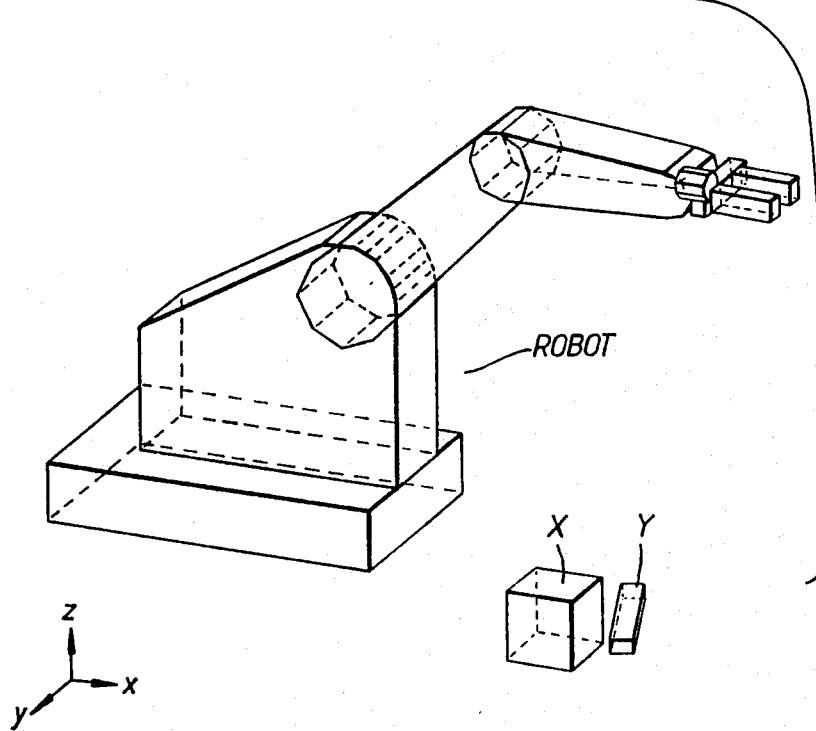
FIG. 5B is a schematic diagram of the display screen which illustrates the state of separation between the two-dimensionally displayed figures for the two objects of FIG. 5A.

Accordingly, if the interferential relationship between two objects X and Y is unclear when they are displayed on the display screen as two-dimensional figures, as in FIG. 5A, a line-of-sight direction which shows the interferential relationship between the two objects can be selected merely be indicating a change in display by designating the two objects at the input 1. The display is changed as shown in FIG. 5B. In other words, two objects X and Y that are displayed as overlapping in FIG. 5A can be displayed as mutually separated two-dimensionally displayed figures as shown in FIG. 5B without the operator going through a series of trial and error changes in the line-of-sight direction.

It should be noted that the present invention is not limited to the embodiment described in the foregoing. Thus, for instance, the algorithm for computational processing for the line-of-sight direction may be modified in various ways such as to be carried out with expanded display conditions and under quantitative conditions. In addition, in showing the interferential relationship among three or more objects, it may be arranged to find a direction along which overlapping among these objects tends to be decreased. In other words, by giving special emphasis to the portion for which the overlapping condition is most critical, the line-of-sight direction may be determined so as to have that portion separated and displayed as two-dimensional figures. Moreover, the particular two-dimensional figure display is not limited to that described in the present embodiment.

What is claimed is:

1. An apparatus for displaying three-dimensional objects in two dimensions comprising:

environmental data memory means for storing form and position data of a plurality of three-dimensional objects;

input means of selecting two three-dimensional objects of said plurality of three-dimensional objects;

means for reading out form and position data of the selected three-dimensional objects from said environmental data memory means;

means for computing a line-of-sight vector for displaying the selected three-dimensional objects as two-dimensional figures with no interference therebetween in accordance with the form and position data that are read out from said environmental data memory means;

means for calculating two-dimensional figure data for the selected three-dimensional objects in accordance with the form and position data read out from said environmental data memory means and the line-of-sight vector computed by said line-of-sight computing means; and means for displaying the selected three-dimensional objects as two-dimensional figures in accordance with the two-dimensional figure data calculated by said calculating means.

2. The apparatus according to claim 1, wherein the form and position data consists of the position coordinates of all apices, the position coordinates of the end points of edge portions of the sides, and the position coordinates of the edge points of the surfaces of each of said plurality of three-dimensional object in a predetermined three-dimensional coordinate space.

3. The apparatus according to claim 1, wherein said input means is capable of changing the two-dimensional figures displayed by the display means, said means for reading out being responsive to said input means.

4. The apparatus according to claim 1, wherein said line-of-sight computation means includes means for determining whether surfaces of the selected three-dimensional objects are of convex form, using respective form and position data of each object.

5. The apparatus according to claim 1, wherein said line-of-sight computing means confirms for the selected three-dimensional objects whether they are interfering with each other based on the respective form and position data of each selected object, and computes the line-of-sight vector when there exists no mutual interference.

6. The apparatus according to claim 5, wherein said line-of-sight computing means computes a normal vector to a plane that separates two selected objects by the use of the respective form and position data for said objects, and determines the line-of-sight vector as a vector orthogonal to the normal vector.

7. An apparatus for displaying a plurality of three-dimensional objects in two-dimensions comprising:
   input means for inputting commands to said apparatus and for selecting two of the plurality of three-dimensional objects;
   display means for displaying two-dimensional figures representative of said three-dimensional objects;
   a simulator responsive to the input means which includes
       environmental data memory means for storing form and position data of the plurality of three-dimensional objects;
       line-of-sight computation means responsive to said form and position data for computing a line-of-sight vector for displaying the plurality of three-dimensional objects as two-dimensional figures, wherein there is not mutual interference among two-dimensionally displayed figures of the two selected three-dimensional objects;
       means responsive to said input means for reading out form and position data of selected three-dimensional objects from said environmental data memory means; and
       display control means for calculating two-dimensional figure data for the selected three-dimensional objects in accordance with the form and position data read out from said environmental data memory means and the line-of-sight vector computed from said line-of-sight computation means.

8. The apparatus according to claim 7 wherein said form and position data is the position coordinates of all apices, the position coordinates of the end points of edges portions of the sides, and the position coordinates of the edge points of the surfaces of each of said plurality of three-dimensional objects in a predetermined three-dimensional coordinate space.

9. A simulator for displaying a plurality of three-dimensional objects in two-dimensions comprising:
   a memory for storing form and position data consisting of position coordinates of the apices, the position coordinates of the end points of edge portions of the sides, and the position coordinates of all edge points of the surfaces of the plurality of three-dimensional objects;
   a keyboard input for designating two selected three-dimensional objects from said memory for reading out the form and position data;
   line-of-sight processor for computing a line-of-sight vector for displaying the two selected three-dimensional objects as two-dimensional figures in accordance with the form and position data read out from the memory wherein there is no mutual interference among two-dimensionally displayed figures of the selected three-dimensional objects along the computed line-of-sight vector;
   a display control unit for calculating two-dimensional figure data for the selected three-dimensional objects in accordance with the form and position data read out from said memory and the line-of sight vector computed by said line-of sight computation unit; and
   a display for displaying the selected three-dimensional objects as two-dimensional figures in accordance with the two-dimensional figure data calculated by the display control unit.

* * * * *